United States Patent
Wan et al.

(10) Patent No.: US 7,143,656 B2
(45) Date of Patent: Dec. 5, 2006

(54) REDUCED AXIAL MOVEMENT ERROR IN A TORQUE-SENSING SYSTEM

(75) Inventors: Hong Wan, Plymouth, MN (US); Michael L. Freeman, Woodbury, MN (US); Charles H. Von Beck, Mesa, AZ (US)

(73) Assignee: Honeywell International, Inc., Morristown, NJ (US)

( * ) Notice: Subject to any disclaimer, the term of this patent is extended or adjusted under 35 U.S.C. 154(b) by 0 days.

(21) Appl. No.: 11/023,075

(22) Filed: Dec. 27, 2004

(65) Prior Publication Data

US 2006/0137473 A1 Jun. 29, 2006

(51) Int. Cl.
G01L 3/02 (2006.01)
G01L 3/10 (2006.01)
G01L 3/12 (2006.01)
G01L 3/14 (2006.01)

(52) U.S. Cl. .................................. 73/862.331
(58) Field of Classification Search ............ 73/862.331
See application file for complete search history.

(56) References Cited

U.S. PATENT DOCUMENTS

| 4,760,745 A | 8/1988 | Garshelis | 73/862.36 |
| 5,255,567 A * | 10/1993 | Miyake et al. | 73/862.333 |
| 5,307,691 A * | 5/1994 | Miyake et al. | 73/862.333 |
| 5,351,555 A | 10/1994 | Garshelis | 73/862.335 |
| 5,520,059 A * | 5/1996 | Garshelis | 73/862.335 |
| 6,490,934 B1 | 12/2002 | Garshelis | 73/862.336 |
| 6,553,847 B1 * | 4/2003 | Garshelis | 73/862.336 |
| 6,776,057 B1 * | 8/2004 | May | 73/862.333 |
| 6,910,391 B1 * | 6/2005 | May | 73/862.333 |

* cited by examiner

*Primary Examiner*—Edward Lefkowitz
*Assistant Examiner*—Octavia Davis
(74) *Attorney, Agent, or Firm*—McDonnell Buehnen Hulbert & Berghoff LLP

(57) ABSTRACT

An improved torque sensing arrangement includes a magnetoelastic ring on a rotatable shaft, along with two or more magnetic field sensors. The ring has at least two magnetic bands magnetized in opposite directions to produce at least two magnetic fields. Alternatively, the rotatable shaft could be magnetized into bands, eliminating the need for a magnetoelastic ring. The magnetic field sensors are positioned next to, but not contacting, the bands, and can be used to measure the field strength, which can be converted to torque. The sensors are preferably positioned to either side of the peak axial magnetic field strength areas of the bands, one offset from the center of one band in a first direction and the other offset from the center of the other band in a second direction opposite the first direction, thereby limiting the average change in the reading when the fields move under the shaft.

10 Claims, 4 Drawing Sheets

REDUCED AXIAL MOVEMENT ERROR IN A TORQUE-SENSING SYSTEM

GOVERNMENT RIGHTS

The United States Government has acquired certain rights in this invention pursuant to Contract No. DAAH10-03-9-0001 awarded by the U.S. Department of the Army.

BACKGROUND OF THE INVENTION

1. Field of the Invention

This invention relates to the field of using magnetic sensors to measure torque applied to a rotatable shaft. More particularly, the invention relates to the particular placement of magnetic torque sensors in relation to magnetic field bands to reduce the axial movement error in a torque system.

2. Description of the Related Art

In control of systems having rotatable drive shafts, torque and speed are the fundamental parameters of interest. The sensing and measurement of torque in an accurate, reliable, and inexpensive manner has been a primary objective of workers for several decades. Examples of applications in which inexpensive torque sensing devices are used include electric power steering systems, rotating shafts in machinery, and others. In such environments, the torque sensing devices are typically required to make low-error continuous torque measurements over extended time periods, despite severe operating conditions.

FIGS. 1 and 1A show a typical system for measuring the torque applied to a rotatable shaft using non-contact magnetic field sensors. The sensors are positioned approximately directly over the peak axial strength area of each band of magnetic field. However, the shaft may have axial movement due to its floating design or the force applied. This configuration is very susceptible to any axial, or left and right, physical movement of the shaft. Since the sum of the sensor readings indicates the amount of torque measured, if the fields change at the sensor locations, due to movement by the shaft or ring, then both sensors will be at a point of lower axial field, as shown in FIG. 2. The signal becomes weaker and is interpreted as a loss of torque, when the actual field and torque is unchanged. This causes a greater tendency for error in the torque reading.

Accordingly, it is desirable to create a more accurate configuration for the magnetic sensors to reduce the torque measurement error due to the physical axial movement of the shaft in the system.

SUMMARY OF THE INVENTION

The present invention meets shortcomings of the other torque sensing devices by arranging the magnetic torque sensors in a manner that minimizes the amount of error in the torque reading.

A magnetoelastic ring is press-fit onto a rotatable shaft to which a torque may be applied. The ring has a cylindrical shape with two magnetic bands that are magnetized in opposite directions. Alternatively, the rotatable shaft could be magnetized into bands, eliminating the need for a magnetoelastic ring. Each band has a peak magnetic field strength along the axial direction near its center. Magnetic sensors, which measure the field strength in the axial direction to determine torque, are positioned next to, but not contacting, the bands. The sensors are positioned to either side of the peak axial field strength areas of the bands, one offset from the center of one band in a first direction and the other offset from the center of the other band in a second direction opposite the first direction, thereby limiting the average change in the reading when the shaft moves in relation to the sensors. Upon axial movement of the shaft (magneto-elastic bands), one sensor measures a decrease in field strength and the other measures an increase. The two field strength measurements are combined and averaged to indicate the torque being applied to the shaft. Since one sensor reading is increasing and the other is decreasing due to axial movement of the shaft (but actual torque remains constant), the total error from the axial movement is less than typical torque sensing arrangements, resulting in a more accurate system.

Additionally, if the sensors are positioned at slopes of the fields that are chosen in such a way that the same amount of increase or decrease occurs when the position of shaft (bands) moves, then the torque reading is essentially immune to the axial movement of the shaft.

DETAILED DESCRIPTION OF PRESENTLY PREFERRED EMBODIMENTS

Figure 1:
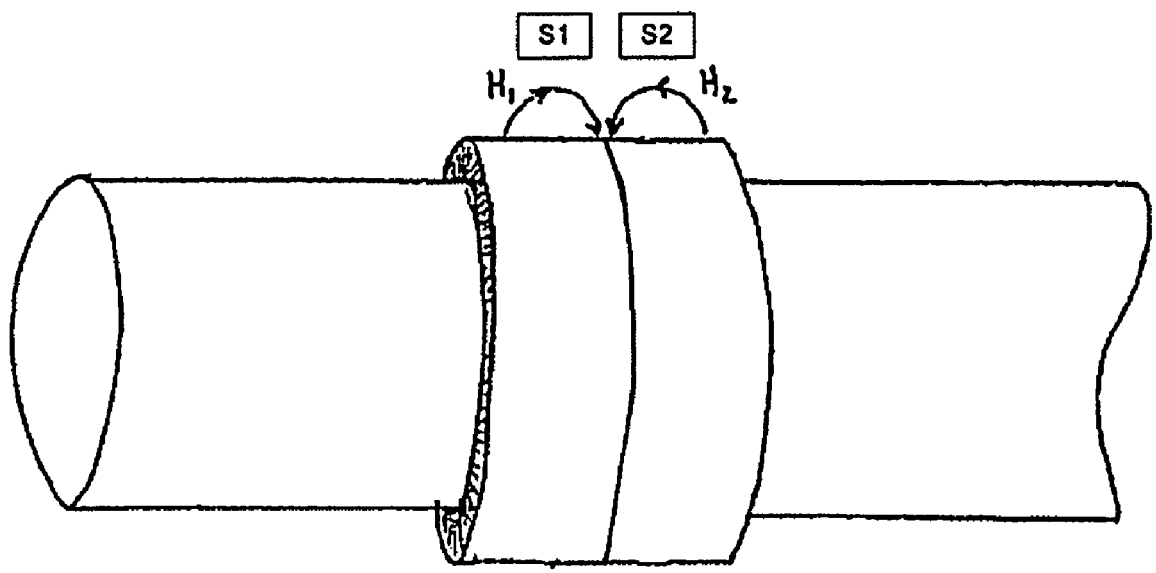
FIG. 1 is a simplified pictorial representation of a conventional sensor arrangement.
Figure 1A:
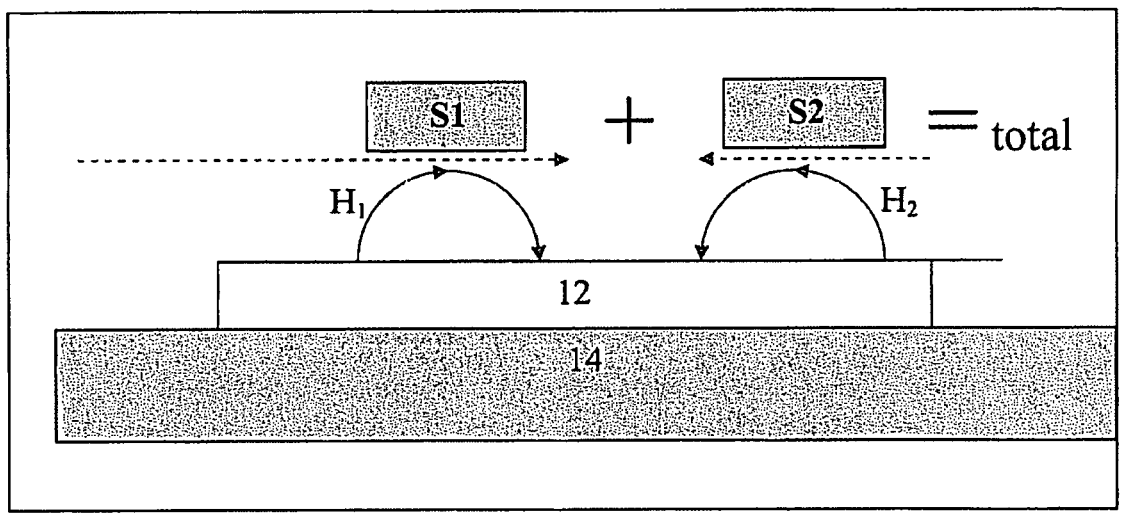
FIG. 1A is a schematic representation of a conventional sensor arrangement.
Figure 2:
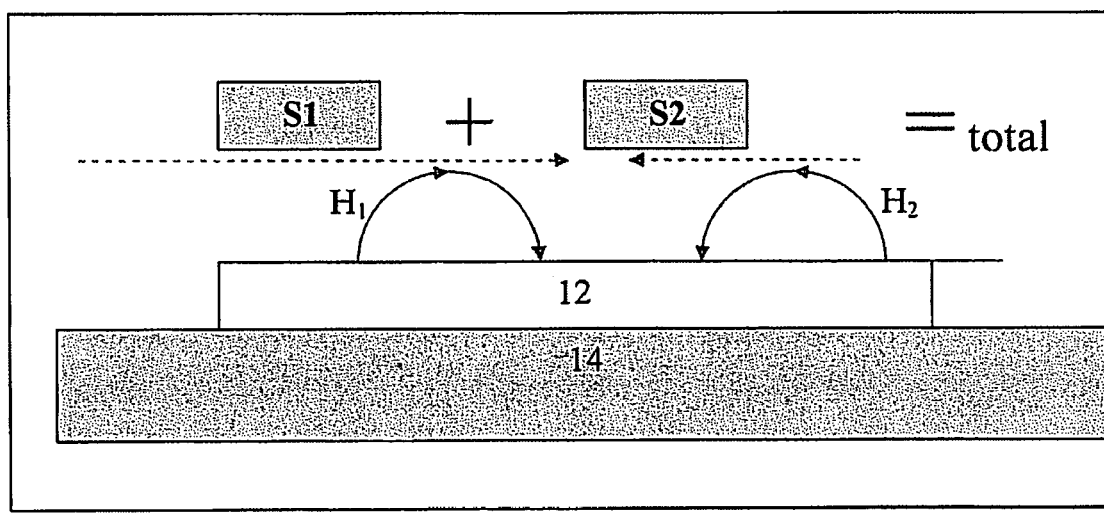
FIG. 2 is a schematic representation of the conventional sensor arrangement shown in FIG. 1A after undergoing axial movement.
Figure 3:
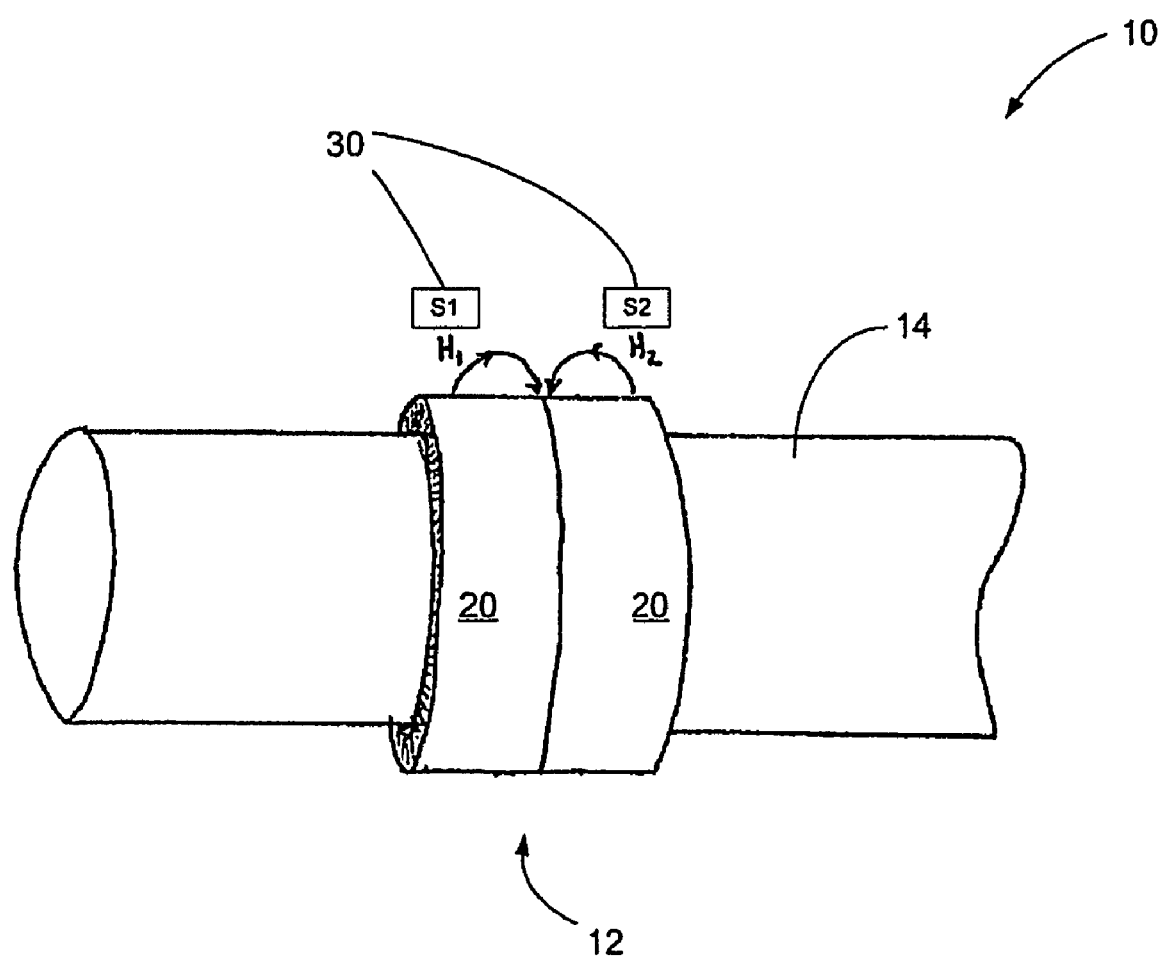
FIG. 3 is a simplified pictorial representation of the sensor arrangement of the present invention.
Figure 3A:
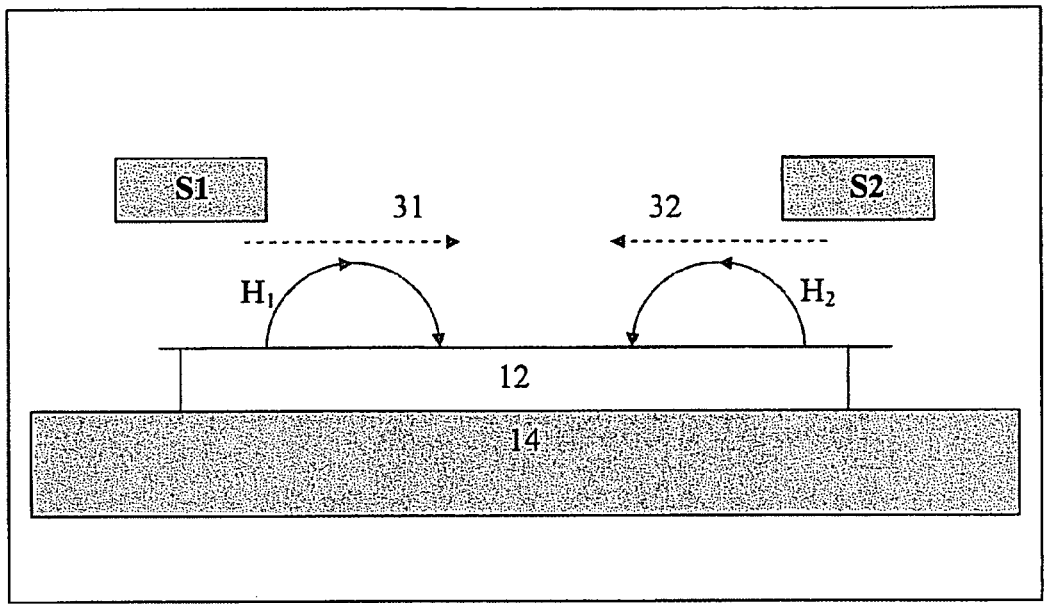
FIG. 3A is a schematic representation of the sensor arrangement of the present invention.
Figure 4:
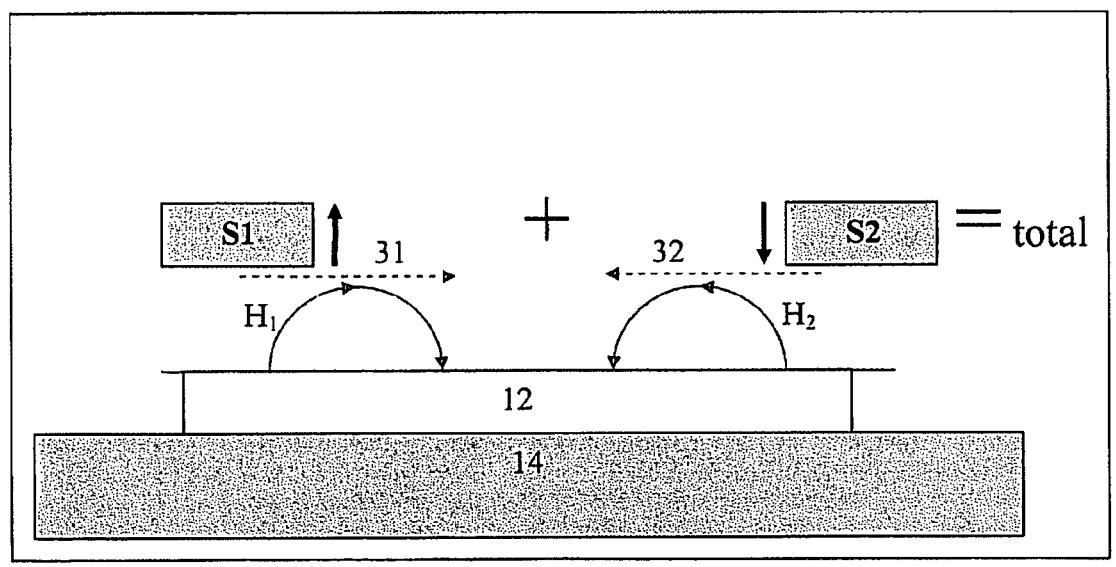
FIG. 4 is a schematic representation of the sensor arrangement shown in FIG. 3A after undergoing axial movement.

As shown in FIGS. 3 and 3A, an improved sensor arrangement 10 includes a magnetoelastic ring 12 press-fit onto a rotatable shaft 14 to which a torque may be applied. The ring 12 generally has a cylindrical shape with two magnetic bands 20 that are magnetized in opposite directions, producing magnetic fields H1 and H2. Alternatively, the rotatable shaft 14 could be magnetized into bands, eliminating the need for a magnetoelastic ring. Magnetic field sensors 30 positioned next to, but not contacting, the bands 20, can be used to measure the field strength along the axial direction, which can be converted to torque. The sensors 30 are positioned to either side of the peak axial field strength areas of the bands 20 so that when the magnetic fields H1 and H2 move (due to movement of the shaft 14 or ring 12), the average change in the reading is limited. One sensor, S1, has sensitivity in the direction of arrow 31 and is offset from the center of one band in a first direction, and the other sensor, S2, has sensitivity in the direction of arrow 32 and is offset from the center of the other band in a second direction opposite the first direction.

If no torque is applied, no field is detected outside the ring 12. When torque is applied, the magnetization of the ring 12 is reoriented and provides a magnetic field outside the ring 12. The axial component of the magnetic field has a maximum value near the center of each band, but since the two bands 20 provide opposite directions for the field, the two sensors 30 that read the signal from the two bands 20 can be used to cancel the unwanted stray field. This common-mode rejection enables a measurement of field strength that is proportional to only the applied torque.

Upon any physical axial movement of the shaft 14, and consequently the bands 20, the sensors S1 and S2 change locations relative to the shaft 14, and therefore measure different magnetic fields from the shaft 14 (bands 20). S1 measures an increase (or decrease) in field strength and S2 measures a decrease (or increase). The two field strength measurements are combined and averaged to indicate the torque being applied to the shaft 14. Since one reading is increasing and the other is decreasing due to the axial movement of the shaft 14 (but actual torque remains constant), the total error is less than typical torque sensing arrangements, resulting in a more accurate system.

Additionally, if the sensors 30 are positioned at slopes of the fields H1 and H2 that are chosen in such a way that the same amount of increase or decrease occurs at any particular moment, then the torque reading is essentially immune to the axial movement.

While certain features and embodiments of the present invention have been described in detail herein, it is to be understood that the invention encompasses all modifications and enhancements within the scope and spirit of the following claims.

We claim:

1. A magnetic torque sensing system for providing a reading indicative of the torque applied to a member about an axially extending axis of a rotatable shaft, the system comprising:
    a magnetoelastic ring positioned on the rotatable shaft and having first and second concentric magnetic field bands, the magnetic field bands having a common edge, each band producing a magnetic field with a peak field strength near the circumferential center of the band when torque is applied; and
    first and second magnetic sensors operable to measure the magnetic fields of the bands in the magnetoelastic ring;
    wherein the first sensor is positioned to a side of the circumferential center of the first band in a direction away from the common edge, and the second sensor is positioned to a side of the circumferential center of the second band in a direction away from the common edge, thereby minimizing error in the sensed torque.

2. The system of claim 1 wherein the first sensor is adjacent to the second sensor.

3. The system of claim 1 wherein the bands are magnetized in opposite directions.

4. The system of claim 1 wherein the ring has a cylindrical shape and is press-fit onto the shaft.

5. A method for reducing the axial movement error in a torque system comprising a ring press-fit onto a shaft, the ring including a first and a second magnetic field band, the hands having a peak field strength in the circumferential center of each band, a first sensor, and a second sensor, the method comprising:
    positioning the first sensor offset from the circumferential center of the first band in a first direction;
    positioning the second sensor offset from the circumferential center of the second band in a second direction, wherein the second direction is opposite the first direction;
    measuring the magnetic field of each of the bands with its respective sensor;
    determining a total magnetic field from the measured magnetic fields of the first and second bands; and
    converting the total magnetic field into torque to obtain an initial torque for the system;
    measuring the magnetic field of each of the bands after axial movement of the ring has occurred;
    determining a total magnetic field from the measured magnetic fields of the first and second bands after axial movement of the ring has occurred; and
    converting the total magnetic field into torque to obtain a final torque for the system, the final total torque being approximately equal to the initial torque.

6. A magnetic torque sensing system for providing a reading indicative of the torque applied to a member about an axially extending axis of a rotatable shaft, the system comprising:
    a magnetoelastic ring press-fit onto the shaft, the magnetoelastic ring having a cylindrical shape;
    first and second concentric magnetic field hands being magnetized in opposite directions and having a common edge;
    the magnetic field bands each having a peak field strength near the circumferential center of the band; and
    first and second magnetic sensors operable to measure the magnetic fields of the bands in the ring;
    wherein the first sensor is positioned to a side of the circumferential center of the first band in a direction away from the common edge and the second sensor is positioned to a side of the circumferential center of the second band in a direction away from the common edge to minimize the error in the torque reading.

7. The system of claim 6 wherein the first sensor is adjacent to the second sensor.

8. A magnetic torque sensing system for providing a reading indicative of the torque applied to a member about an axially extending axis of a rotatable shaft, the system comprising:
    the rotatable shaft having first and second concentric magnetic field bands having a common edge, each band producing a magnetic field with a peak field strength near the circumferential center of the band when torque is applied; and
    first and second magnetic sensors operable to measure the magnetic fields of the bands;
    wherein the first sensor is positioned to a side of the circumferential center of the first band in a direction away from the common edge, and the second sensor is positioned to a side of the circumferential center of the second band in a direction away from the common edge, thereby minimizing error in the sensed torque when the shaft moves in an axial direction.

9. The system of claim 8 wherein the first sensor is adjacent to the second sensor.

10. The system of claim 8 wherein the bands are magnetized in opposite directions.

* * * * *